Feb. 26, 1924.
H. A. DAVIS
LOOM TEMPLE
Filed Sept. 23, 1922
1,485,343
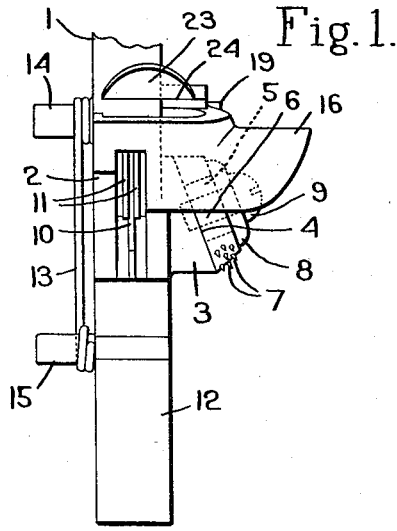
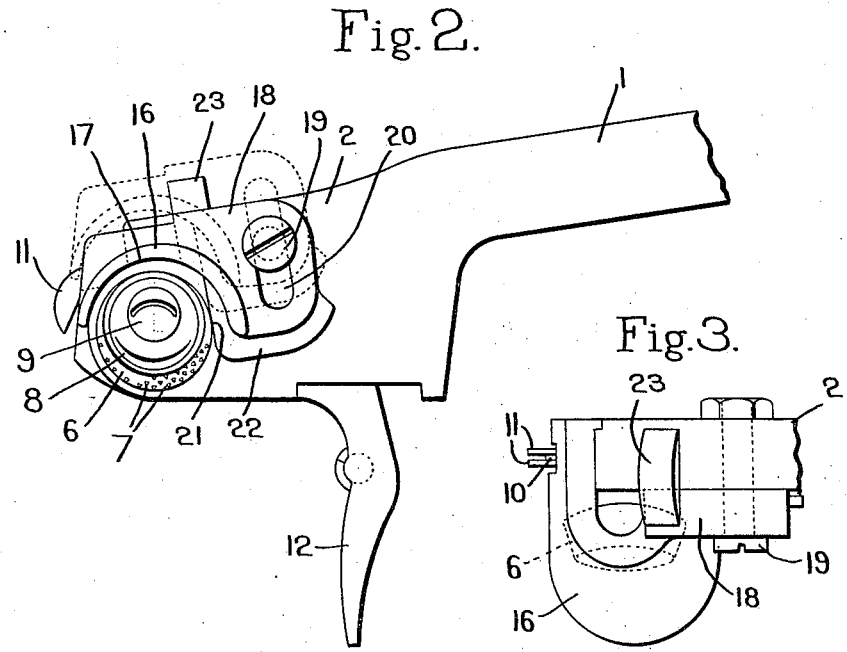
Inventor.
Harry A. Davis
by Heard Smith & Tennant.
Attys.

Patented Feb. 26, 1924.

1,485,343

UNITED STATES PATENT OFFICE.

HARRY A. DAVIS, OF HOPEDALE, MASSACHUSETTS, ASSIGNOR TO DRAPER CORPORATION, OF HOPEDALE, MASSACHUSETTS, A CORPORATION OF MAINE.

LOOM TEMPLE.

Application filed September 23, 1922. Serial No. 590,017.

*To all whom it may concern:*

Be it known that I, HARRY A. DAVIS, a citizen of the United States, and resident of Hopedale, county of Worcester, State of Massachusetts, have invented an Improvement in Loom Temples, of which the following description, in connection with the accompanying drawing, is a specification, like characters on the drawing representing like parts.

This invention relates to improvements in loom temples and the object thereof is to provide an improved form of cap to co-operate with the toothed roll of the temple. More particularly the invention relates to improvements in loom temples of the general type disclosed in the patent to Stimpson No. 1,037,358 granted September 3, 1912. The temple disclosed in the Stimpson patent comprises the usual shank which is slidably mounted in a stand and provided with a head having a roll, over which the cloth travels, rotatably mounted upon an axis extending upwardly in oblique relation to the vertical plane of the head. A cap partially enclosing the roll is provided which is pivotally connected to the head to swing about an axis extending longitudinally of said head.

In the present invention a temple having a toothed roll of the same general type is provided, but the cap is pivoted to swing about an axis extending at right angles to the longitudinal plane of the temple head in the same general direction as the axis of the roll.

One of the objects of the present invention is to provide a loom temple having a cap pivotally mounted upon such a laterally extending axis which may be swung about its pivotal support without danger of injurying the teeth of the temple roll.

Another object of the invention is to provide means for attaching the cap to the temple head in such a manner that it will be positively retained in operative relation to the temple roll.

A further object of the invention is to provide a cap of the class described with means for securing the same to the head which will require the cap to be raised bodily before it can be swung about its pivot to expose the temple roll.

A further object of the invention is to provide means for securing the cap to the temple in such a manner that it may be adjusted toward and from the periphery of the temple roll in parallelism therewith and locked in any desired adjusted position.

These and other objects and features of the invention will more fully appear from the following description and the accompanying drawing and will be pointed out in the claims.

A preferred embodiment of the invention is illustrated in the accompanying drawing, in which, Fig. 1 is a front elevation, slightly in perspective, of the temple;

Fig. 2 is a side elevation of the temple showing in full lines the cap for the temple roll in normal position and in dotted lines the position to which the cap must be raised before it can be swung about its pivotal connection to the temple head; and, Fig. 3 is a detail plan view of the head of the temple and cap in assembled position.

The temple is illustrated in the accompanying drawing as embodying a thread cutter of the usual type, but it will be understood that the invention is applicable also to temples without the thread cutting devices such as are usually used at the opposite side of the loom from that upon which the temple containing the thread cutter is mounted.

The temple illustrated in the accompanying drawing comprises the usual shank 1 which is slidably mounted for slight yielding movement in a suitable stand (not shown) and a head 2 upon which the temple roll and cap are mounted. The temple head desirably is provided with a laterally extending boss 3 having an inclined face 4 from which a journal 5 projects at right angles to the face 4. A temple roll 6, which has a plurality of series of fine teeth 7, is rotatably mounted upon the journal 5 and is held in position by a washer 8 and a central screw 9 which extends axially into the journal 4.

The temple thread cutter illustrated is provided with a usual form of thread cutter consisting of a central stationary blade 10 and a pair of co-operating reciprocating blades 11 which are connected to an arm 12 adapted to be engaged by the lay upon its beat-up, said blades being normally held in advance position by a spring 13 which is connected to a stud 14 upon the outside of the temple and to a stud 15 upon the arm 12.

The parts heretofore described may be, and are, of usual construction.

The present invention relates particularly to the cap which co-operates with the temple roll. This cap comprises a metallic member, preferably a casting, having a substantially semi-cylindrical portion 16 provided with a concave under face 17 which partially encloses and extends in substantial parallelism with the periphery of the temple roll and desirably projects a distance beyond the end of said roll. The semi-cylindrical portion of the cap is formed integral with a body or plate 18 which lies against the side of the temple.

One of the principal features of the invention consists in providing means for slidably and pivotally connecting the cap to the temple in such a manner that it will be required to be raised bodily away from the temple roll before it can be swung aside to expose the temple roll when the cloth is to be introduced, or the toothed roll assembled or replaced.

As illustrated in the present invention the cap is pivotally mounted upon a stud or preferably a screw 19 which passes through a substantially vertical slot 20 in the plate 18 of the cap. The plate 18 is provided with a shoulder 21 presenting a straight edge which engages the periphery of the boss 3 in such a manner as to require the cap to be raised bodily before it can be swung about its pivot. The shoulder 21, as illustrated herein, is formed upon a flange 22 which extends downwardly from the under portion of the plate 18. By reason of this construction any injury to the teeth of the temple roll is prevented when the cap is swung about its pivot to expose the temple roll.

This construction also provides means by which the cap may be adjusted toward and from the periphery of the roll for different kinds of cloth, or to provide a different bend or bight in the cloth which passes over the roll and beneath the edges of the cap so that the tension imposed upon the cloth by the temple may be varied.

A usual hold-down device is provided for preventing the cap from being raised by the tension of the cloth which passes beneath the edges of the cap and around the roll. As illustrated herein the hold-down comprises a locking stud or screw seated in the upper wall of the temple head and provided with a head 23 having a flat under face 24 adapted to be swung over the plate 18 of the cap. This screw may be raised or lowered to hold the cap down properly in adjusted positions and may be swung aside to permit the cap to be raised and swung about its pivotal stud 19.

It will be noted that by reason of the construction above described the shoulder 21 upon the cap, which engages the boss on the temple head, together with the pivotal screw or stud when the latter is clamped upon the plate 18, will retain the cap positively in normal operative position at any desired position of adjustment. When the locking stud 23 is released and the clamping screw or stud 19 unscrewed the cap may be raised until the lower end of the shoulder passes above the boss sufficiently to permit the cap to be swung about the pivotal stud 19. Thus the cap can be readily removed from normal position and swung aside without danger of injury to the teeth of the temple roll.

It will be understood that the embodiment of the invention disclosed herein is of an illustrative character and is not restrictive and that various changes in form, construction and arrangement of parts may be made within the spirit and scope of the following claims.

Having thus described my invention, what I claim as new, and desire to secure by Letters Patent, is:

1. A loom temple comprising a shank having a head, a toothed roll rotatably mounted upon a journal extending laterally from said head, a cap having a concave face partially enclosing and normally lying in proximity to the periphery of said roll, means pivotally connecting said cap to said head and means requiring said cap to be bodily moved away from said roll before said cap can be swung pivotally to expose the roll whereby contact of the cap with the teeth of the roll will be prevented.

2. A loom temple comprising a shank having a head, a toothed roll rotatably mounted upon a journal extending laterally from said head, a cap having a concave face partially enclosing and normally lying in proximity to the periphery of said roll, means pivotally and slidably connecting said cap to said head to permit the cap to be swung upwardly to expose the roll and means for preventing pivotal movement of said cap until after the cap has been moved bodily away from said roll whereby contact of the cap with the teeth of the roll during the pivotal movement thereof will be prevented.

3. A loom temple comprising a shank having a head, a toothed roll rotatably mounted upon a journal extending laterally from said head, a cap having a concave face partially enclosing and normally lying in proximity to the periphery of said roll, adjustable means pivotally and slidably connecting said cap to said roll to permit the cap to be swung upwardly to expose the roll and co-operating shoulders on said head and said cap operable positively to position said cap in proper relation to the periphery of said roll in any position of adjustment and acting to prevent contact of the cap with the roll.

4. A loom temple comprising a shank having a head provided with a laterally extending boss having a journal projecting therefrom, a toothed roll rotatably mounted on said journal, a cap having a concave face partially enclosing and normally lying in proximity to the periphery of said roll, a shoulder on said cap engaging said boss, a stud on said head extending laterally therefrom in the same general direction as that of said journal and a slot in said cap to receive said stud extending in parallelism with said shoulder.

5. A loom temple comprising a shank having a head provided with a laterally extending boss having a journal projecting therefrom, a toothed roll rotatably mounted on said journal, a cap having a concave face partially enclosing and normally lying in close proximity to said roll, a shoulder on said cap presenting a straight edge normally engaging said boss, a slot in said cap extending in parallelism with said shoulder and a screw seated in said head extending through said slot operable to clamp said cap against said head and upon release to permit said cap to be slidably moved and swung pivotally to expose said roll.

6. A loom temple comprising a shank having a head, a toothed roll mounted upon a journal extending laterally from said head, a cap having a concave face partially enclosing and normally lying in proximity to the periphery of said roll and means securing said cap to said head operable to permit said cap to be adjusted bodily toward and from said roll in parallelism therewith whereby the bight in the material passing over said roll may be varied and also operable to permit said cap to be swung aside, without detachment, to expose the roll.

In testimony whereof, I have signed my name to this specification.

HARRY A. DAVIS.